United States Patent
Haga et al.

(10) Patent No.: US 10,439,467 B2
(45) Date of Patent: Oct. 8, 2019

(54) MOTOR

(71) Applicant: Nidec Corporation, Kyoto (JP)

(72) Inventors: Hidehiro Haga, Kyoto (JP); Ryusuke Sato, Kyoto (JP); Masashi Sonoda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/223,301

(22) Filed: Dec. 18, 2018

(65) Prior Publication Data

US 2019/0123613 A1    Apr. 25, 2019

Related U.S. Application Data

(63) Continuation of application No. 15/472,320, filed on Mar. 29, 2017, now Pat. No. 10,193,410, which is a continuation of application No. PCT/JP2015/069676, filed on Jul. 8, 2015.

(30) Foreign Application Priority Data

Sep. 30, 2014  (JP) .................................. 2014-201410

(51) Int. Cl.

| H02K 5/22 | (2006.01) |
| H02K 3/50 | (2006.01) |
| H02K 3/28 | (2006.01) |
| H02K 5/10 | (2006.01) |
| H02K 5/173 | (2006.01) |
| H02K 11/33 | (2016.01) |

(52) U.S. Cl.
CPC ............... *H02K 5/225* (2013.01); *H02K 3/28* (2013.01); *H02K 3/50* (2013.01); *H02K 5/10* (2013.01); *H02K 5/1732* (2013.01); *H02K 11/33* (2016.01)

(58) Field of Classification Search
CPC . H02K 5/22; H02K 11/33; H02K 3/28; H02K 3/50; H02K 5/10; H02K 5/173
See application file for complete search history.

(56) References Cited

U.S. PATENT DOCUMENTS

| 8,963,388 | B2 * | 2/2015 | Miyachi | B62D 5/0406 310/71 |
| 2007/0145838 | A1 * | 6/2007 | Uchitani | H02K 3/522 310/68 B |
| 2011/0006625 | A1 * | 1/2011 | Fujii | H02K 3/522 310/71 |

OTHER PUBLICATIONS

Haga et al., "MOTOR", U.S. Appl. No. 15/472,320, filed Mar. 29, 2017.

* cited by examiner

*Primary Examiner* — Julio C. Gonzalez
*Assistant Examiner* — Leda T Pham
(74) *Attorney, Agent, or Firm* — Keating & Bennett, LLP

(57) ABSTRACT

A motor includes a rotor, a stator, a housing, a bus bar assembly, a cover fixed to the housing, and a circuit board. The bus bar assembly includes a bus bar, a wiring member, and a bus bar holder. The bus bar holder includes a main body portion, a connector portion, and a connection terminal holding portion. The cover directly or indirectly contacts a second side of the main body portion. The wiring member includes a circuit board connection terminal fixed to the connection terminal holding portion and an external power-supply connection terminal. At least one other portion of the wiring member is located closer to a second side of the motor than the external power-supply connection terminal.

13 Claims, 5 Drawing Sheets

MOTOR

CROSS REFERENCE TO RELATED APPLICATIONS

This application claims the benefit of priority to Japanese Patent Application No. 2014-201410 filed on Sep. 30, 2014 and is a Continuation Application of PCT Application No. PCT/JP2015/069676 filed on Jul. 8, 2015. The entire contents of each application are hereby incorporated herein by reference.

BACKGROUND OF THE INVENTION

1. Field of the Invention

The present disclosure relates to a motor.

2. Description of the Related Art

One example of conventional motors has a stator equipped with a bus bar. For example, the motor includes a bus bar electrically connected to a stator, and a bus bar holder holding a wiring member electrically connected to the hall IC. In order to prevent water, oil, or the like from flowing into the motor, the space between a housing (cover) and a bus bar holder is sealed.

In the above-mentioned motor, the bus bar is connected to the stator by soldering or the like, and the wiring member is connected to the hall IC by soldering or the like. In this case, when a portion contacting a cover within the bus bar holder is deformed by heat caused by soldering or the like, a gap between the cover and the bus bar holder occurs such that sealability between the cover and the bus bar holder is reduced. As a result, it is preferable that the above connection is carried out at a specific position spaced apart from the portion contacting the cover within the bus bar holder.

However, if the number of electronic components mounted to the motor is increased so as to improve responsiveness or the like, a circuit board including the electronic components is easily mounted to the motor. However, in the above-mentioned structure, an outer edge of the circuit board is likely to be located close to the contact portion between the cover and the bus bar holder. As a result, when the wiring member is connected to the circuit board, the bus bar holder may be deformed by heat.

SUMMARY OF THE INVENTION

In accordance with one preferred embodiment of the present invention, a motor includes a rotor including a shaft with a center on a center axis extending in one direction from a first side of the motor to a second side of the motor, a stator enclosing the rotor and rotating the rotor about the center axis, a cylindrical housing holding the stator, a bus bar assembly including a surface facing the first side of the motor and opposing the housing, and a circuit board disposed in the bus bar assembly and opposing an inner surface of the bus bar assembly in a radial direction which is perpendicular to the center axis. The bus bar assembly includes: a wiring member electrically connecting an external power supply to the circuit board, and a bus bar holder that holds the wiring member. The bus bar holder includes: a cylindrical main body portion, and a connector portion that protrudes from the main body portion toward a radially outer side of the center axis. The wiring member includes: an external power-supply connection terminal provided in the connector portion to be electrically connected to the external power-supply, and a circuit board connection terminal that is electrically connected to the circuit board. At least one other portion of the wiring member is located closer to the second side of the motor in the one direction than the external power-supply connection terminal.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Motors according to preferred embodiments of the present invention will hereinafter be described with reference to the attached drawings. Further, the scope of the present invention is not limited to the following preferred embodiments, but may be arbitrarily changed within the technical spirit of the present invention. To easily understand each component in the following drawings, an actual structures, and a scale of each structure, the number of structures, etc., may be different.

Figure 1:
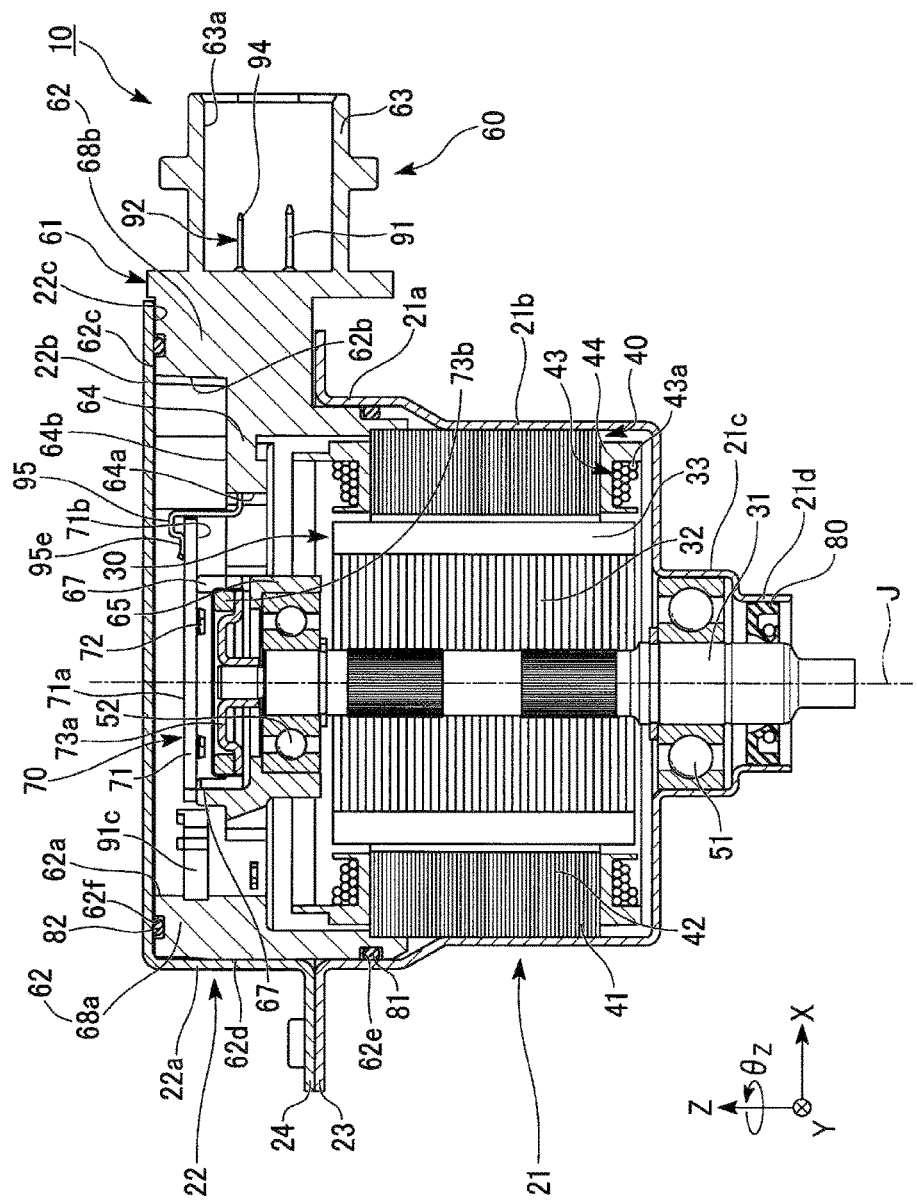
FIG. 1 is a cross-sectional view illustrating a motor according to a preferred embodiment of the present invention.

In the drawings, an X-Y-Z coordinate system is provided as an appropriate three-dimensional (3D) orthogonal coordinate system. In the X-Y-Z coordinate system, a direction parallel to the axial direction (one direction) of a center axis J shown in FIG. 1 will hereinafter be referred to as a Z-axis direction. A direction parallel to a longitudinal direction of a bus bar assembly 60 shown in FIG. 1, that is, the left-and-right direction of FIG. 1, is referred to as an X-axis direction. A direction parallel to a width direction of the bus bar assembly 60, that is, a direction perpendicular to both the X-axis direction and the Z-axis direction, is referred to as a Y-axis direction.

In the following description, a positive side of the Z-axis direction (+Z side, a second side) will hereinafter be defined as 'rear side' and a negative side of the Z-axis direction (−Z side, a first side) will hereinafter be defined as 'front side.' It is to be understood that the descriptions of the rear side and the front side are used for explanation only, and they do not limit location relation or direction of the actual motor, members, and the like. unless otherwise explained, a direction parallel to the center axis J (Z-axis direction) is simply referred to as 'axial direction,' a radial direction having its center on the center axis J is simply referred to as 'radial direction,' and a circumferential direction having its center on the center axis J, that is, the axial circumference of center axis J (θZ direction), is simply referred to as 'circumferential direction.'

Further, herein, descriptions such as being axially extended do not only refer to a case of strictly being extended in the axial direction (Z-axis direction), but it may also include the other case of being extended in a direction inclined at less than about 45° relative to the axial direction, for example. Also, descriptions such as being radially extended do not only refer to a case of strictly being extended in the radial direction, that is, the direction perpendicular to the axial direction (Z-axis direction), but it may also include a case of being extended in a direction inclined at less than about 45° relative to the radial direction, for example.

FIG. 1 is a cross-sectional view illustrating a motor 10 according to a preferred embodiment of the present invention. The motor 10 according to the present preferred embodiment is a brushless motor. As illustrated in FIG. 1, the motor 10 preferably includes a housing 21, a cover 22, a rotor 30 including a shaft 31, a stator 40, a first bearing 51, a second bearing 52, a controller 70, a bus bar assembly 60, and a plurality of O-rings. The plurality of O-rings preferably includes a front side O-ring 81 and a rear side O-ring 82.

The rotor 30, the stator 40, the first bearing 51, and the oil seal 80 are accommodated into the housing 21. The housing 21 is opened toward the rear side (+Z side). An end of the front side (−Z side) of the bus bar assembly 60 is inserted into the opening of the housing 21. The bus bar assembly 60 holds the second bearing 52. The first bearing 51 and the second bearing 52 support both sides of the axial direction (Z-axis direction) of the shaft 31.

The cover 22 covers at least a portion of the rear side (+Z side) of the bus bar assembly 60. The cover 22 is fixed to the housing 21. The cover 22 preferably includes a cylindrical portion 22a, a cover portion 22b, a front surface 22c of the cover, and a rear side flange portion 24. The controller 70 is located between the second bearing 52 and the cover 22. The front side O-ring 81 is located between the bus bar assembly 60 and the housing 21. The rear side O-ring 82 is located between the bus bar assembly and the cover 22. The above-mentioned components will hereinafter be described in greater detail below.

The housing 21 is preferably a cylindrical or substantially cylindrical member, and holds the stator 40 and the first bearing 51. In a preferred embodiment of the present invention, the housing 21 preferably has a multi-stepped cylindrical shape or a substantially multi-stepped shape with open ends on both sides. In this preferred embodiment, a material of the housing 21 is, for example, metal. In more detail, it is preferred that a material of the housing 21 is, for example, aluminum, iron alloy, or the like.

The housing 21 preferably includes a front side flange portion 23, a bus bar assembly insertion portion 21a, a stator holding portion 21b, a front bearing holding portion 21c, and an oil seal holding portion 21d. The front side flange portion 23, the bus bar assembly insertion portion 21a, the stator holding portion 21b, the front bearing holding portion 21c, and the oil seal holding portion 21d are disposed in a direction from the rear side (+Z side) to a front side (−Z side) along the axial direction (Z-axis direction). That is, in the housing 21, the front side flange portion 23 is preferably disposed at a rearmost side and the oil seal holding portion 21d is preferably disposed at a frontmost side. Each of the bus bar assembly insertion portion 21a, the stator holding portion 21b, the front bearing holding portion 21c, and the oil seal holding portion 21d has a concentric cylindrical or substantially cylindrical shape. A diameter of the above members are reduced in the order of the bus bar assembly insertion portion 21a, the stator holding portion 21b, the front bearing holding portion 21c, and the oil seal holding portion 21d.

The front side flange portion 23 extends from the end of the rear side (+Z side) of the bus bar assembly insertion portion 21a toward a radially outer side. That is, the housing 21 includes a housing flange portion 23 at the end of the rear side. The bus bar assembly insertion portion 21a encloses an end of a front side (−Z side) of the bus bar assembly 60 from the radially outer side of the center axis J. In other words, at least a portion of the end of the front side (−Z side) of the bus bar assembly 60 is disposed in the bus bar assembly insertion portion 21a. That is, the end of the front side of the bus bar assembly 60 is disposed in the housing 21.

An outer surface of a stator 40 (preferably an outer surface of a core back portion 41, to be described later) is fitted into an inner surface of the stator holding portion 21b. Accordingly, the stator 40 is fixed to the housing 21. The front bearing holding portion 21c holds the first bearing 51. In this preferred embodiment, the inner surface of the front bearing holding portion 21c preferably is fitted into the outer surface of the first bearing 51. The oil seal 80 is held in the oil seat holding portion 21d.

The rotor 30 preferably includes a shaft 31, a rotor core 32, and a rotor magnet 33. The shaft 31 has its center on the center axis J which extends in one direction (Z-axis direction). According to this exemplary preferred embodiment, the shaft 31 is a cylindrical or substantially cylindrical member. Further, the shaft 31 may be a solid member or as a hollow cylindrical member. The shaft 31 is rotatably supported around the axis (in ±θZ direction) by the first bearing 51 and the second bearing 52. The end of the front side (−Z side) of the shaft 31 protrudes to the outside of the housing 21. In the oil seal holding portion 21d, the oil seal 80 is disposed around the axis of the shaft 31.

The rotor core 32 is preferably a cylindrical or substantially cylindrical member. The rotor core 32 is fixed to the shaft 31 while enclosing the shaft 31 around the axis (in the θZ direction). In more detail, the rotor core 32 preferably includes a through-hole which penetrates axially through the rotor core 32. At least a portion of the shaft 31 is disposed within the through-hole of the rotor core 32. The shaft 31 is fixed to the rotor core 32 by, for example, press-fitting, adhesion, or the like. The rotor magnet 33 is fixed to an outer surface along an axis circumference of the rotor core 32. In more detail, according to this exemplary preferred embodiment, the rotor magnet 33 preferably has an annular or substantially annular shape. The outer surface of the rotor core 32 faces the inner surface of the rotor magnet 33. The rotor magnet 33 is fixed to the rotor core 32 by, for example, an adhesive, or the like. Further, the shape of the rotor magnet 33 is not necessarily annular. The rotor magnet 33 may be defined by a plurality of magnets arranged on an outer circumferential surface of the rotor core 32 in a circumferential direction. The rotor core 32 and the rotor magnet 33 rotates integrally with the shaft 31.

The stator 40 preferably has a cylindrical or substantially cylindrical shape. The rotor 30 is located in the stator 40. In other words, the stator 40 encloses the rotor 30 around the axis (in the θZ direction). The rotor 30 may relatively rotate around the center axis J with respect to the stator 40. The stator 40 preferably includes a core back portion 41, a plurality of teeth portions 42, a plurality of coils 43, and a plurality of bobbins 44. According to this exemplary preferred embodiment, the core back portion 41 and the teeth portion 42 is a stacked steel plate in which a plurality of electromagnetic steel plates are stacked.

The core back portion 41 may have a cylindrical or substantially cylindrical shape. Preferably, the shape of the core back portion 41 is concentric with the shaft 31. The plurality of teeth portions 42 are disposed on an inner surface of the core back portion 41. Each teeth portion 42 extends from the inner surface of the core back portion 41 toward a radially inner side (that is, toward the shaft 31). Preferably, the teeth portions 42 are arranged at equal or substantially equal intervals in the inner surface of the core back portion 41 in the circumferential direction.

Preferably, the bobbin 44 is a cylindrical or substantially cylindrical member. Each bobbin 44 is respectively mounted on one of the teeth portions 42. Preferably, the bobbin is defined by at least two members engaged from an axial direction. Each coil 43 is disposed in each bobbin 44. Each coil 43 is provided preferably by winding a conductive wire 43a about a bobbin 44. Further, as the conductive wire 43a, a circular wire or a flat wire is preferably used.

The first bearing 51 is disposed at a front side (−Z side) of the stator 40. The first bearing 51 is held by the front bearing holding portion 21c. The second bearing 52 is disposed at the rear side (+Z side) opposite to the front side of the stator 40. The second bearing 52 is held by a rear bearing holding portion 65 of a bus bar holder 61 which will be described later.

The first bearing 51 and the second bearing 52 support the shaft 31. According to this exemplary preferred embodiment, each of the first bearing 51 and the second bearing 52 is a ball bearing. However, the type of the first bearing 51 and the second bearing 52 is not particularly limited to the above bearing type. For example, different kinds of bearings such as a sleeve bearing and a fluid hydraulic bearing may also be used. Further, the type of bearing of the first bearing 51 may be different from that of the second bearing 52.

The oil seal 80 preferably is an annular or substantially annular member. The oil seal 80 is mounted in the oil seal holding portion 21d around the axis (in the θZ direction) of the shaft 31. In more detail, the oil seal 80 is disposed in the oil seal holding portion 21d. An end of an axial lower portion of the shaft 31 penetrates through the through-hole of the oil seal 80. The oil seal 80 is disposed between the oil seal holding portion 21d and the shaft 31. Therefore, the oil seal 80 may prevent water, oil, etc., from infiltrating from a gap between the oil seal holding portion 21d and the shaft 31 into the housing 20. The oil seal 80 is preferably made of, for example, a resin material. However, a configuration and a material of the oil seal 80 are not limited thereto, and therefore an oil seal of different kinds of configurations and materials may also be used.

The controller 70 controls driving operations of the motor 10. The controller 70 preferably includes the circuit board 71, a rotating sensor 72, a sensor magnet holding member 73a, and a sensor magnet 73b. That is, the motor 10 includes the circuit board 71, the rotation sensor 72, the sensor magnet holding member 73a, and the sensor magnet 73b.

The circuit board 71 is disposed on an extending line of the rear side (+Z side) of the shaft 31. The circuit board 71 is disposed between the second bearing 52 and the cover 22 in the axial direction (Z-axis direction). The circuit board 71 includes a circuit board rear surface 71a located at the rear side and a circuit board front surface 71b located at the front side (−Z side). The circuit board rear surface 71a and the circuit board front surface 71b define a main surface of the circuit board 71. That is, the circuit board front surface 71b and the circuit board rear surface 71a intersect with the center axis J (Z-axis). In this preferred embodiment, the main surface of the circuit board 71 is preferably perpendicular or substantially perpendicular to the center axis J (or Z-axis). The circuit board rear surface 71a faces the cover front surface 22c.

The circuit board 71 is supported by the end of the rear side (+Z side) of a plurality of circuit board support portions 67 to be described later. At least one side of the main surface of the circuit board 71 is provided with a printed wiring (not shown). The circuit board 71 outputs, for example, a motor driving signal, etc.

The sensor magnet holding member 73a is an annular member. A hole at a center of the sensor magnet holding member 73a is fitted with a small diameter of the end of the rear side (+Z side) of the shaft 31. Accordingly, the position of the sensor magnet holding member 73a is determined on the basis of the shaft 31. Preferably, the sensor magnet holding member 73a is fixed to the shaft 31 by press-fitting, adhesion, etc. The sensor magnet holding member 73a may rotate along with the shaft 31.

The sensor magnet 73b preferably has an annular or substantially annular shape. An N pole and an S pole of the sensor magnet 73b are alternately disposed in the circumferential direction. The sensor magnet 73b is fitted on an outer circumferential surface of the sensor magnet holding member 73a. In more detail, at least a portion of the sensor magnet 73b comes in contact with the outer circumferential surface of the sensor magnet holding member 73a. Therefore, the sensor magnet 73b is fixed to the sensor magnet holding member 73a. As a result, the sensor magnet 73b is disposed at the circumference (±θZ direction) of the shaft 31 at the rear side (+Z side) of the second bearing 52 such that the sensor magnet 73b is able to rotate along with the shaft 31.

At least one rotation sensor 72 is preferably mounted on the front surface 71b of the circuit board. The rotation sensor faces the sensor magnet 73b in the axial direction (Z-axis direction). The rotation sensor 72 detects the position of the rotor depending on a change in magnetic flux of the sensor magnet 73b. Although not illustrated, according to the present exemplary preferred embodiment, three rotation sensors 72 preferably are disposed on, for example, the front surface 71b of the circuit board. Further, as the rotation sensor 72, for example, a hall device, etc., is used.

Figure 2:
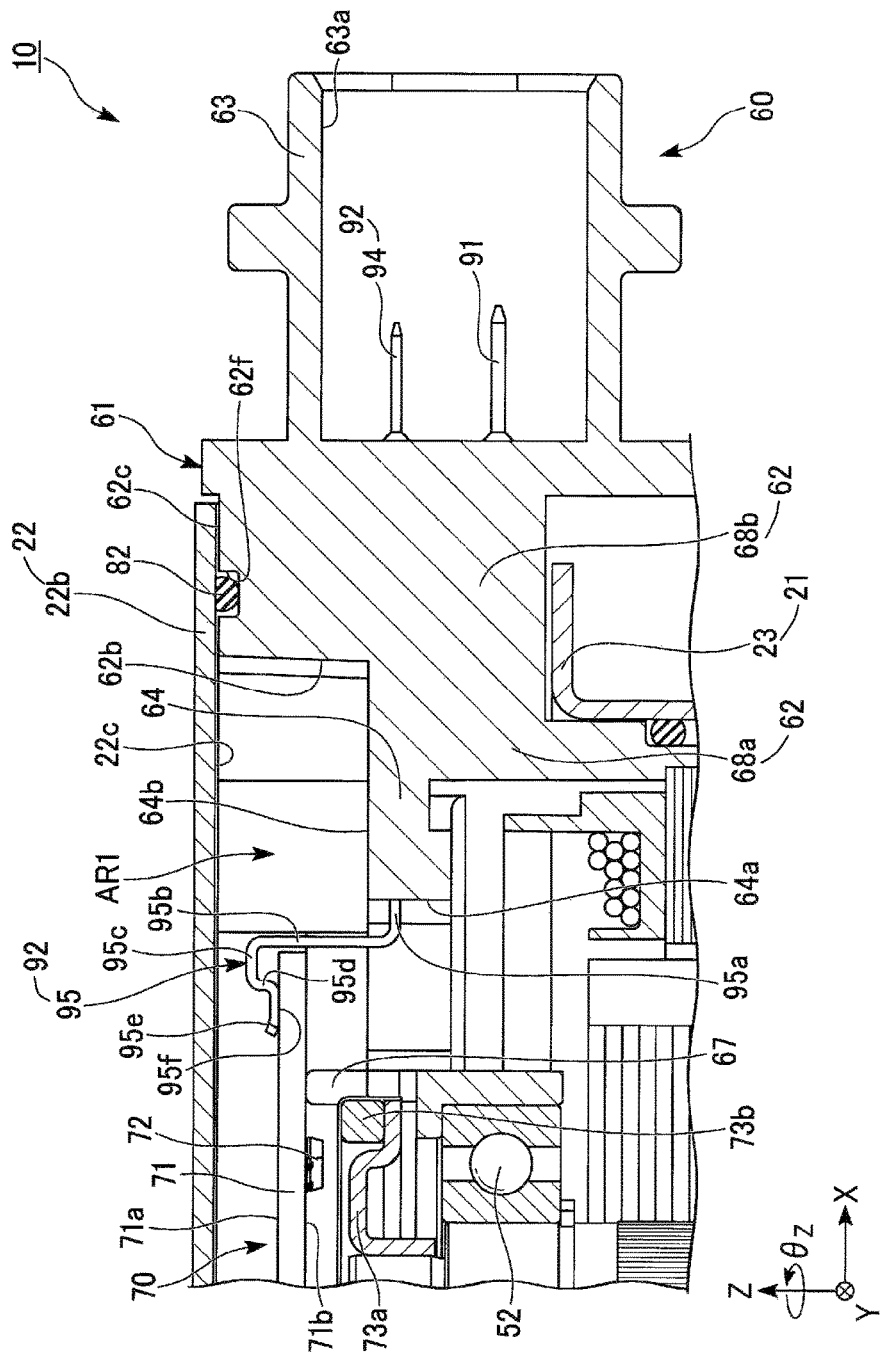
FIG. 2 is a partially enlarged cross-sectional view illustrating the motor according to a preferred embodiment of the present invention.
Figure 3:
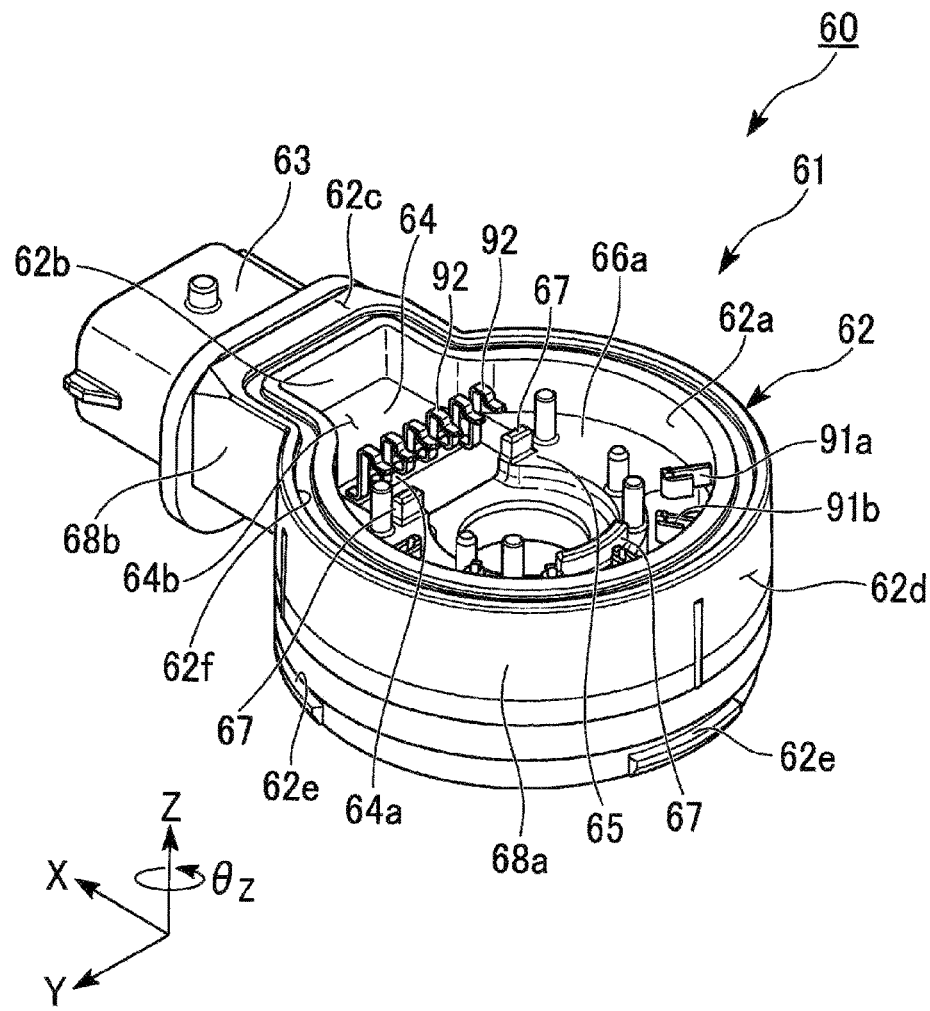
FIG. 3 is a perspective view illustrating a bus bar assembly according to a preferred embodiment of the present invention.
Figure 4:
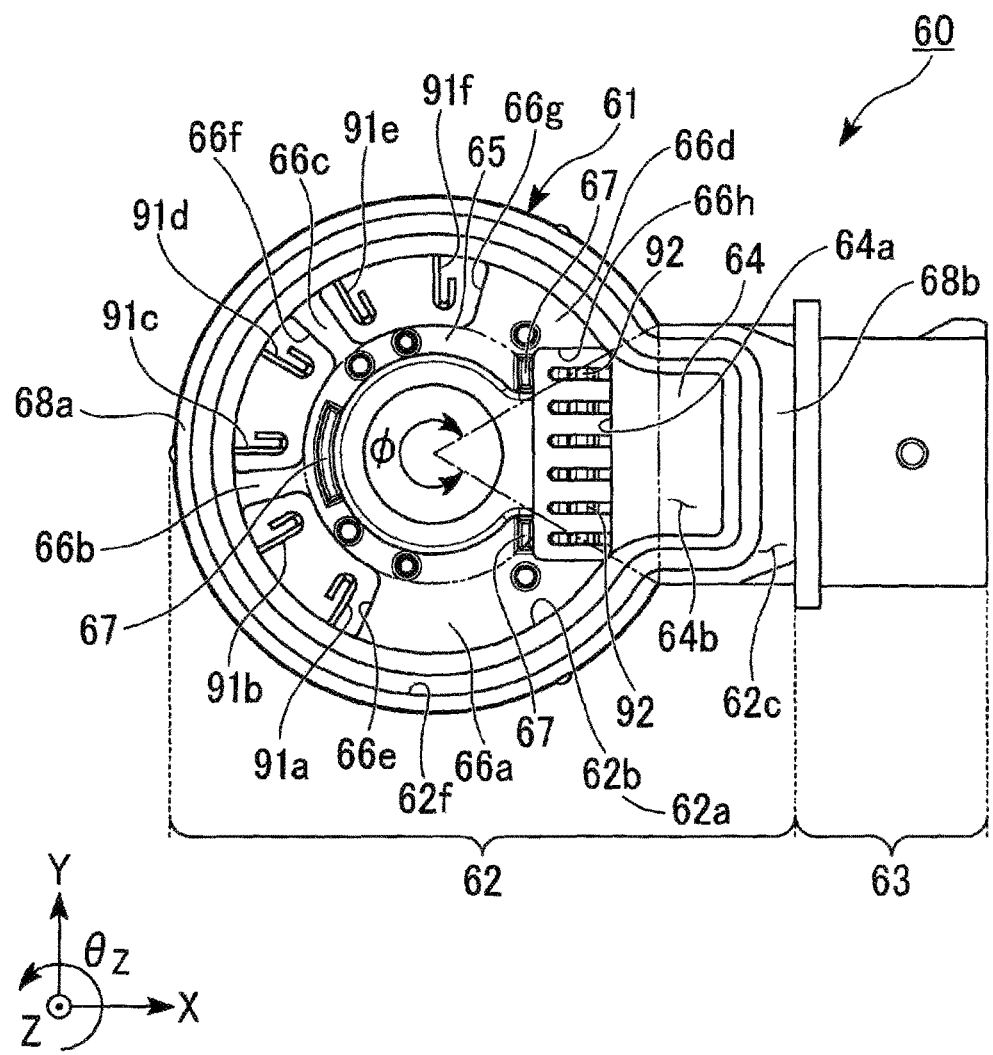
FIG. 4 is a plan view illustrating the bus bar assembly according to a preferred embodiment of the present invention.

FIG. 2 is a partial cross-sectional view illustrating a portion of the motor 10. In more detail, FIG. 2 is a partially enlarged view of the motor shown in FIG. 1. FIG. 3 is a perspective view illustrating the bus bar assembly 60. FIG. 4 is a plan view illustrating a bus bar assembly 60.

The bus bar assembly 60 supplies a driving current from an external power source to the stator 40. As illustrated in FIGS. 1 to 4, the bus bar assembly 60 preferably includes a bus bar holder 61, at least one bus bar 91, and a wiring member 92. In addition, in this preferred embodiment, the bus bar assembly 60 includes a plurality of the bus bars 91.

The bus bar holder 61 is preferably defined by a holder made of resin. Preferably, a material forming the bus bar holder is an electrically insulating resin. The bus bar holder 61 holds the bus bar 91 and the wiring member 92. As illustrated in FIG. 1, a rear side (+Z side) of the bus bar holder 61 is accommodated in the cylindrical portion 22a. In this preferred embodiment, the bus bar holder 61 is press-fitted into the cylindrical portion 22a. At least a portion of a front side (−Z side) of the bus bar holder 61 is accommodated in the bus bar assembly insertion portion 21a of the housing 21.

As long as a material forming the bus bar holder 61 has an insulation property, any material may be used without being specially limited. The bus bar holder 61 is preferably manufactured as a single monolithic member by, for example, injection molding. As illustrated in FIGS. 3 and 4, the bus bar holder 61 includes a main body portion 62, a connector portion 63, a connection terminal holding portion 64, a rear bearing holding portion 65, connection portions 66a, 66b, 66c, and 66d, and a plurality of circuit board support portions 67.

As illustrated in FIGS. 1 and 3, the main body portion 62 preferably has a cylindrical or substantially cylindrical shape enclosing the center axis J in the circumferential direction (θZ direction). The main body portion 62 includes an opening 62a at the rear side (+Z side) thereof. The main body portion 62 includes an inner surface 62b of a main body portion, a rear surface 62c of the main body portion located at the rear side, and an outer surface 62d of the main body portion. A rear surface 62c of the main body is preferably provided with a groove portion 62f. The groove portion 62f is provided along the contour of the main body portion 62 enclosing the opening 62a. A rear side O-ring 82 is fitted into the groove portion 62f. As illustrated in FIG. 3, the front side (−Z side) of the outer surface 62d of the main body portion is provided with an O-ring holding portion 62e. As illustrated in FIG. 1, the front side O-ring 81 is fitted into the front side O-ring holding portion 62e. Further, an air gap is preferably housed within the main body portion 62 at a position radially outward from an end of the circuit board 71 and between the circuit board 71 and an inner surface of the main body portion.

As illustrated in FIGS. 3 and 4, the main body portion preferably includes an arc portion 68a and a connector connection portion 68b. As illustrated in FIG. 4, in this preferred embodiment, the shape of a cross section (XY cross-section) perpendicular to the center axis J of the arc portion 68a and the shape of a plane view (XY plane view) is an arc shape concentric with the rear bearing holding portion 65. Preferably, a central angle of the arc shape may be φ240° or higher, for example. As illustrated in FIG. 1, in this preferred embodiment, the arc portion 68a is preferably press-fitted into the cylindrical portion 22a of the cover 22.

As illustrated in FIGS. 3 and 4, the connector connection portion 68b is a portion connected to the connector portion 63. The connector connection portion 68b is connected to both ends of the arc portion 68a. The connector connection portion 68b protrudes toward the connector portion 63 (+_X side). The rear bearing holding portion 65 is disposed in the main body portion 62 along the radial direction. The rear bearing holding portion 65 holds the second bearing 52.

As illustrated in FIG. 4, the connection portions 66a, 66b, 66c, and 66d connect the main body portion 62 to the rear bearing holding portion 65 disposed in the main body portion 62. The connection portions 66a-66d are positioned at the circumference of the rear bearing holding portion 65 while being spaced apart from each other at equal or substantially equal intervals along the circumferential direction.

Gaps 66e, 66f, 66g, and 66h are provided among the connection portions 66a-66d neighboring with each other in the circumferential direction. That is, gaps 66e, 66f, 66g, and 66h are provided between the rear bearing holding portion 65 and the main body portion 62. The gap 66e is defined by the connection portion 66a, the connection portion 66b, the main body portion 62, and the rear bearing holding portion 65. The gap 66f is defined by the connection portion 66b, the connection portion 66c, the main body portion 62, and the rear bearing holding portion 65. The gap 66g is defined by the connection portion 66c, the connection portion 66d, the main body portion 62, and the rear bearing holding portion 65. The gap 66h is defined by the connection portion 66d, the rear bearing holding portion 65, the connection portion 66a, the connection terminal holding portion 64, and the main body portion 62.

In a plane view, the position of the gap 66e is a position including coil connection portions 91a and 91b to be described later. In a plane view, the position of the gap 66f is a position including coil connection portions 91c and 91d to be described later. In a plane view, the position of the gap 66g is a position including coil connection portions 91e and 91f to be described later. In a plane view, the position of the gap 66h is a position including a circuit board connection terminal 95 to be described later. In a plane view, the appearance of the gap 66h is a rectangular or substantially rectangular shape.

At least one circuit board support portion 67 protrudes from the surface of the rear side (+Z side) of the rear bearing holding portion 65 toward the rear side. In the example illustrated in FIG. 4, three circuit board support portions 67 preferably are disposed on the surface of the rear side of the rear bearing holding portion 65. The circuit board support portion 67 supports the circuit board 71 at the end of the rear side.

The connector portion 63 is a portion connected to external power supply (not shown). The connector portion 63 preferably has a cylindrical or substantially cylindrical shape. The connector portion 63 preferably has a rectangular or substantially rectangular parallelepiped shape. The connector portion 63 extends from a portion of the outer surface of the connector connection portion 68b to the radially outer side (+X side) of the center axis J. The connector portion 63 has an opening at the radially outer side (+X side). That is, the connector portion 63 protrudes from the main body portion 62 toward the radially outer side of the center axis J. As can be seen from FIG. 1, the entirety of the connector portion 63 preferably is exposed outside the cover 22.

As illustrated in FIG. 1, the connector portion 63 includes an opening 63a for a power supply opened toward one side (+X side) disposed in a longitudinal direction of the bus bar holder 61. A bottom surface of the power-supply opening 63a is provided with the bus bar 91 and an external power-supply connection terminal 94 to be described later. The bus bar 91 and the external power-supply connection terminal 94 protrudes from the bottom surface of the power-supply opening 63a toward one side (+X side) disposed in the longitudinal direction of the bus bar holder 61.

As illustrated in FIGS. 2 to 4, the connection terminal holding portion 64 has a rectangular or substantially rectangular parallelepiped shape. The connection terminal holding portion 64 protrudes toward the radially inner side from the inner surface 62b of the main body portion 62. In more detail, as illustrated in FIG. 4, the connection terminal holding portion 64 extends from the inner surface of the connector connection portion 68b in the direction (−X direction) opposite to the direction in which the connector portion 63 extends. Accordingly, at least a portion of the connection terminal holding portion 64 overlaps with the connector portion 63 in the radial direction.

The connection terminal holding portion 64 includes an inner surface 64a of the holding portion in the radial direction. The end of the rear side (+Z side) at the holding-portion inner surface 64a is located at the front side (−Z side) ahead of the circuit board rear surface 71a. The connection terminal holding portion 64 has the holding portion rear surface 64b at its rear side. In this preferred embodiment, the entirety of the holding portion rear surface 64b preferably is parallel or substantially parallel to an XY plane. The end of the rear side of the connection terminal holding portion 64 is located at the front side ahead of the circuit board rear surface 71a. That is, the holding portion rear surface 64b is located at the front side ahead of the circuit board rear surface 71a. In addition, the holding portion rear surface 64b is located at the front side ahead of the rear surface 62c of the main body portion.

As illustrated in FIG. 2, an air gap AR1 is constructed at the rear side (+Z side) of the connection terminal holding portion 64. The air gap AR1 is disposed between the circuit board 71 and the inner surface 62b of the main body portion. In more detail, the air gap AR1 is disposed between the circuit board 71 and the inner surface of the connector connection portion 68b in the inner surface 62b of the main body portion.

The bus bar 91 is a thin plate-shaped member made of an electrically conductive material (for example, metal, etc.). The bus bar 91 is directly or indirectly electrically connected to the stator 40. The driving current is supplied from external power supply or the like to the stator 40 through the bus bar 91. Although not shown in the drawings, according to this preferred embodiment, the plurality of bus bars 91 is mounted to the stator 40. For example, if the motor is a three-phase motor, at least three bus bars 91 are mounted to the stator 40. In addition, according to a difference in coil wiring methods, the number of bus bars 91 may be changed to, for example, 4 or higher. Each bus bar 91 is disposed in the bus bar holder 61. One end of the bus bar 91 protrudes from the bottom surface of the power-supply opening 63a. One end of the bus bar 91 is exposed outside the cover 22. For example, the external power supply is connected to one end of the bus bar 91 exposed outside the cover 22.

As illustrated in FIG. 4, the plurality of bus bars 91 include coil connection portions 91a, 91b, 91c, 91d, 91e, and 91f. The coil connection portions 91a-91f are disposed at other ends of the plurality of bus bars 91. The coil connection portions 91a-91f protrude from the inner surface 62b of the main body portion. In more detail, the coil connection portions 91a-91f preferably protrude from the inner surface of the arc portion 68a of the main-body-portion inner surface 62b toward the radially inner side.

As illustrated in FIG. 1, the end of the rear side (+Z side) of the coil connection portion 91c is located at the rear side ahead of the circuit board front surface 71b. At least a portion of the coil connection portion 91c overlaps with the circuit board 71 in the radial direction. The coil connection portion 91c is electrically connected to the coil 43 through a connection member (not shown). Accordingly, the bus bar 91 is electrically connected to the stator 40. The above-mentioned preferred embodiment has disclosed only the coil connection portion 91c from among the coil connection portions 91a, 91b, 91c, 91d, 91e, and 91f. However, in the above-mentioned description, the coil connection portions 91a, 91b, and 91d-91f may be identical in structure to the coil connection portion 91c, and as such a detailed description thereof will herein be omitted.

As illustrated in FIG. 2, the wiring member 92 is fixed to the bus bar holder 61. That is, a portion of the wiring member 92 is preferably embedded within the bus bar holder 61. The wiring member 92 electrically connects the external power supply (not shown) to the circuit board 71. The wiring member 92 includes the external power-supply connection terminal 94 and the circuit board connection terminal 95. The external power-supply connection terminal 94 and the circuit board connection terminal 95 are exposed from the bus bar holder 61. Further, at least one portion of the wiring member 92 other than the external power-supply connection terminal 94 is preferably located closer to the cover 22 than the external power-supply connection terminal 94 is. For example, a circuit board connection terminal 95 is preferably located closer to the cover 22 than the external power-supply connection terminal 94 is.

The external power-supply connection terminal 94 is disposed in the connector portion 63. The external power-supply connection terminal 94 protrudes from the bottom surface of the power-supply opening 63a. The external power-supply connection terminal 94 is electrically connected to the external power supply (not shown).

The circuit board connection terminal 95 is located at the front side (−Z side) ahead of the end of the rear side (+Z side) of the main body portion 62, such that the circuit board connection terminal 94 is fixed to the connection terminal holding portion 64. That is, in this preferred embodiment, the circuit board connection terminal 95 is located at the front side (−Z side) ahead of the rear surface 62c of the main body portion, such that the circuit board connection terminal 95 is fixed to the connection terminal holding portion 64. The circuit board connection terminal 95 protrudes from the front end of the radially inner side of the connection terminal holding portion 64. That is, as illustrated in the example of FIG. 2, the circuit board connection terminal 95 protrudes from the holding portion inner surface 64a. Further, a portion of the circuit board 71 is preferably located to extend closer to the external power-supply connection terminal 94 in a radial direction than a portion of the circuit board connection terminal 95 is.

The circuit board connection terminal 95 preferably includes a first terminal portion 95a, a second terminal portion 95b, a third terminal portion 95c, a fourth terminal portion 95d, and a plate-shaped portion 95e. The first terminal portion 95a protrudes toward the radially inner side from the holding portion inner surface 64a. The first terminal portion 95a is located at the outside of the radial direction ahead of the circuit board 71. According, as shown in FIG. 2, the circuit board connection terminal 95 preferably includes a bent portion which is bent at or almost at a right angle.

The second terminal portion 95b extends from the end of the inner side of the radial direction of the first terminal portion 95a toward the rear side (+Z side). The second terminal portion 95b extends to a further rear side ahead of the circuit board rear surface 71a. The third terminal portion 95c extends from the end of the rear side (+Z side) of the second terminal portion 95b toward the radially inner side. The fourth terminal portion 95d extends from the third terminal portion 95c to the front side (−Z side).

The plate-shaped portion 95e extends from the end of the front side of the fourth terminal portion 95d toward the radially inner side. The plate-shaped portion 95e is disposed at the end of the radially inner side of the circuit board connection terminal 95. The plate-shaped portion 95e includes a connection surface 95f at the front side. The connection surface 95f is parallel or substantially parallel to the circuit board rear surface 71a. The connection surface 95f contacts the circuit board rear surface 71a. Although not shown in the drawings, the plate-shaped portion 95e is preferably fixed to the circuit board 71 by, for example, soldering. Therefore, the circuit board connection terminal 95 is electrically connected to the circuit board 71. That is, the wiring member 92 is electrically connected to the circuit board 71.

In this preferred embodiment, as illustrated in FIG. 4, in the circumferential direction (θZ direction) of the center axis J, the position of the circuit board connection terminal 95 is different from those of the coil connection portions 91a-91f of the bus bar 91.

As illustrated in FIG. 1, the front side O-ring 81 is disposed in the housing 21. The front side O-ring 81 is fixed to the O-ring holding portion 62e of the bus bar holder 61. The front side O-ring 81 contacts the inner surface of the housing 21 and the outer surface of the main body portion 62 over the circumference. That is, the front side O-ring 81 contacts the main body portion 62 and the housing 21 over the circumference. Stress generated from the inner surface of the bus bar assembly insertion portion 21a is loaded on the front side O-ring 81.

The rear side O-ring 82 is disposed in the cover 22. The rear side O-ring 82 is fitted into the groove portion 62f. The cover 22, to be described later, includes a cover front surface 22c at the front side (−Z side) of the cover portion 22b. The entire circumference of the rear side O-ring 82 contacts the cover front surface 22c, to be described later. Stress generated from the cover front surface 22c is loaded on the rear side O-ring 82.

In this preferred embodiment, the front side O-ring 81 and the rear side O-ring 82 are preferably made of, for example, resin including silicon rubber or the like. If the O-rings 81 and 82 are made of silicon rubber, the front side O-ring 81 and the rear side O-ring 82 are preferably manufactured by, for example, machining elongated silicon rubber having a round cross section in a ring shape. However, a configuration and a material of the front side O-ring 81 and the rear side O-ring 82 are not limited thereto.

The cover 22 is attached to the rear side (+Z side) of the housing 21. A material of the cover 22 is preferably, for example, metal. In more detail, as the material of the cover 22, for example, aluminum or an iron alloy such as SUS is used. As described above, the cover 22 includes a cylindrical portion 22a, a cover portion 22b, a cover front surface 22c, and a rear side flange portion 24.

The cylindrical portion 22a is opened toward the front side (−Z side). The cylindrical portion 22a encloses the bus bar assembly 60 from the radially outer side of the center axis J. In more detail, the cylindrical portion 22a encloses the end of the rear side (+Z side) of the main body portion 62 from the radially outer side of the center axis J. In other words, at least a portion of the end of the rear side (+Z side) of the main body portion 62 is disposed in the cylindrical portion 22a. The cylindrical portion 22a is connected to the end of the rear side (+Z side) of the bus bar assembly insertion portion 21a through the front side flange portion 23 and the rear side flange portion 24.

The cover portion 22b is connected to the end of the rear side (+Z side) of the cylindrical portion 22a. In this preferred embodiment, the cover portion 22b preferably has a plate shape. The cover portion 22b preferably includes the cover front surface 22c at the front side (−Z side). The cover portion 22b closes the opening 62a, to be described later. The cover front surface 22c contacts the entire circumference of the rear side O-ring 82. Therefore, the cover 22 indirectly contacts the main body rear surface 62c through the rear side O-ring 82 over a circumference of the opening 62a.

The rear side flange portion 24 extends from the end of the front side (−Z side) of the cylindrical portion 22a toward the radially outer side. At least a portion of the front side flange portion 23 and at least a portion of the rear side flange portion 24 are bonded to each other while overlapping with each other, such that the housing 21 is bonded to the cover 22.

For example, the external power supply is connected to the motor 10 through the connector portion 63. The bus bar 91 protrudes from the bottom surface of the power-supply opening 63a. The connected external power supply is electrically connected to the bus bar 91 and the wiring member 92. Therefore, the driving current is supplied from the external power supply to the coil 43 and the rotation sensor 72 through the bus bar 91 and the wiring member 92. The rotation sensor 72 detects the magnetic flux of the rotor magnet. The driving current supplied to the coil 43 is controlled depending on the rotating position of the rotor 30 calculated based on, for example, the detected magnetic flux of the rotor magnet. When the driving current is supplied to the coil 43, a magnetic field is generated in the coil 43. In other words, when the driving current is supplied to the coil 43, a torque is generated between the rotor 30 and the stator 40. With this torque, the rotor 30 having the shaft 31 rotates. By doing so, the motor 10 obtains a rotational driving force.

In this preferred embodiment, the rear side O-ring 82 is disposed in the main body rear surface 62c. In addition, the cover 22 indirectly contacts the main body rear surface 62c through the rear side O-ring 82. That is, the rear side O-ring 82 is disposed between the cover 22 and the bus bar holder 61. Therefore, spacing between the cover 22 and the bus bar holder 61 is sealed. As a result, water, oil, etc., may be prevented from flowing into the motor 10.

In addition, the end of the rear side at the holding portion inner surface 64a is located at the front side ahead of the circuit board rear surface 71a. Therefore, at the radially outer side of the circuit board 71, the air gap AR1 is defined in the connection terminal holding portion 64. The air gap AR1 is defined between the circuit board 71 and the main body portion 62. Therefore, when the circuit board connection terminal 95 of the wiring member 92 is connected to the circuit board 71, the main body portion 62 may be prevented from being deformed by heat, such as heat produced during soldering. Accordingly, the above-mentioned preferred embodiment significantly reduces or prevents deterioration of sealability between the cover 22 and the bus bar holder 61 sealed by the rear side O-ring 82.

The circuit board connection terminal 95 protrudes from the holding portion inner surface 64a toward the radially inner side. Therefore, a radial distance between the circuit board connection terminal 95 and the main body portion 62 may increase. As a result, deformation of the main body portion 62 caused by heat, such as heat produced during soldering, is able to be further reduced or prevented. In addition, according to this preferred embodiment, the circuit board connection terminal 95 may not be located in the air gap AR1. Therefore, the circuit board connection terminal 95 is easily connected to the circuit board 71. In addition, the wiring member 92 may preferably be constructed in a manner that the circuit board connection terminal 95 is able to be linearly connected to the external power-supply connection terminal 94. As a result, the wiring member 92 is able to be easily manufactured.

The holding portion rear surface 64b may be located at the front side ahead of the circuit board rear surface 71a. Therefore, a numerical value of the radial direction of the air gap AR1 may be further increased. Therefore, the above-mentioned preferred embodiment is able to further reduce or prevent deformation of the bus bar holder 61 when the circuit board connection terminal 95 is connected to the circuit board 71.

The holding portion rear surface 64b is located at the front side ahead of the main body rear surface 62c. Therefore, as illustrated in FIGS. 1 and 2, the circuit board 71 may be disposed in the main body portion 62. As a result, the cover portion 22b located at the rear side of the main body portion 62 may have a plate shape, for example. In addition, spacing between the main body portion 62 and the cover 22 may be sealed by, for example, the rear side O-ring 82. Therefore, the above-mentioned preferred embodiment may easily and simply perform shaping of the cover 22, and may improve sealability between the cover 22 and the bus bar holder 61.

The ends of the rear side of the coil connection portions 91a-91f are preferably located at the rear side ahead of the circuit board front surface 71b. Therefore, the end of the rear side of the coil connection portions 91a-91f is located at the rear side ahead of the circuit board support portion 67 supporting the circuit board 71. Therefore, from the side of the opening 62a, the coil connection portions 91a-91f may be easily connected to the coil 43.

At least a portion of the coil connection portions 91a-91f overlap with the circuit board 71 in the radial direction, such that a numerical value of the axial direction of the motor 10 is able to be reduced.

The circuit board connection terminal 95 preferably includes the plate-shaped portion 95e including the connection surface 95f. The connection surface 95f is in contact with the circuit board rear surface 71a. Therefore, according to this preferred embodiment, the contact region between the circuit board connection terminal 95 and the circuit board 71 may be increased in size, and the circuit board connection terminal 95 and the circuit board 71 may be stably fixed.

The position of the circuit board connection terminal 95 is different in position from the coil connection portions 91a-91f in the circumferential direction centered on the center axis J. Therefore, when the circuit board connection terminal 95 is connected to the circuit board 71 and the coil connection portions 91a-91f are connected to the coil 43, mutual interference between the circuit board connection terminal 95 and the coil connection portions 91a-91f is able to be reduced or prevented, resulting in facilitation of each connection.

The rear side O-ring 82 is disposed on the main body rear surface 62c, such that sealability between the cover 22 and the bus bar holder 61 is able to be improved.

In addition, the following constituent elements can also be applied to preferred embodiments of the present invention.

In the above-mentioned description, the entirety of the holding portion rear surface 64b preferably is located at the front side ahead of the circuit board rear surface 71a. However, the position of the holding portion rear surface 64b is not limited to the above-mentioned position. In various preferred embodiments, other portions of the holding portion rear surface 64b may be located at the same position as that of the circuit board rear surface 71a in the axial direction within the range in which the end of the rear side of the holding portion rear surface 64b is located at the front side ahead of the circuit board rear surface 71a, and may also be located at the rear side ahead of the circuit board rear surface 71a.

The holding portion rear surface 64b may be an inclined plane or a curved surface with respect to the radial direction, for example.

The circuit board connection terminal 95 may also protrude from the remaining portions other than the holding portion inner surface 64a. In this preferred embodiment, for example, the circuit board connection terminal 95 may also protrude from the holding portion rear surface 64b.

The circuit board rear surface 71a may also be located at the rear side ahead of the main body portion 62. According to this preferred embodiment, in the radial direction, the circuit board rear surface 71a does not overlap with the main body portion 62. Therefore, the above-mentioned preferred embodiment is able to further reduce or prevent deformation of the main body portion 62 affected by heat when the circuit board connection terminal 95 is connected to the circuit board rear surface 71a.

In the axial direction, the holding portion rear surface 64b may also be identical in position to the main body rear surface 62c. By this structure, the structure in which the circuit board 71 is located at the rear side ahead of the main body portion 62 is able to be easily applied to the preferred embodiment.

In the above-mentioned description, the circuit board 71 is located at the rear side of the shaft 31. However, the position of the circuit board 71 is not limited thereto. For example, a through-hole may be defined in the circuit board 71, and the shaft 31 may be inserted into the through-hole. In this case, the end of the rear side of the shaft 31 preferably protrudes toward the rear side of the circuit board 71.

In the above-mentioned description, the rear side O-ring 82 preferably is a member that seals a gap between the cover 22 and the bus bar holder 61. However, according to this preferred embodiment, the scope of the member that seals the gap between the cover 22 and the bus bar holder 61 is not limited to the above-mentioned member. For example, a liquid gasket or the like may be used in the sealing member. Similarly, the scope of a member that seals a gap between the housing 21 and the bus bar holder 61 is not limited to the above-mentioned member, and a liquid gasket and the like may also be used in the sealing member.

If the liquid gasket is used to seal spacing between the cover 22 and the bus bar holder 61, the cover 22 may directly contact the main body rear surface 62c over a circumference of the opening 62a. That is, according to this modified preferred embodiment, the cover 22 may directly or indirectly contact the main body rear surface 62c over a circumference of the opening 62a.

Figure 5:
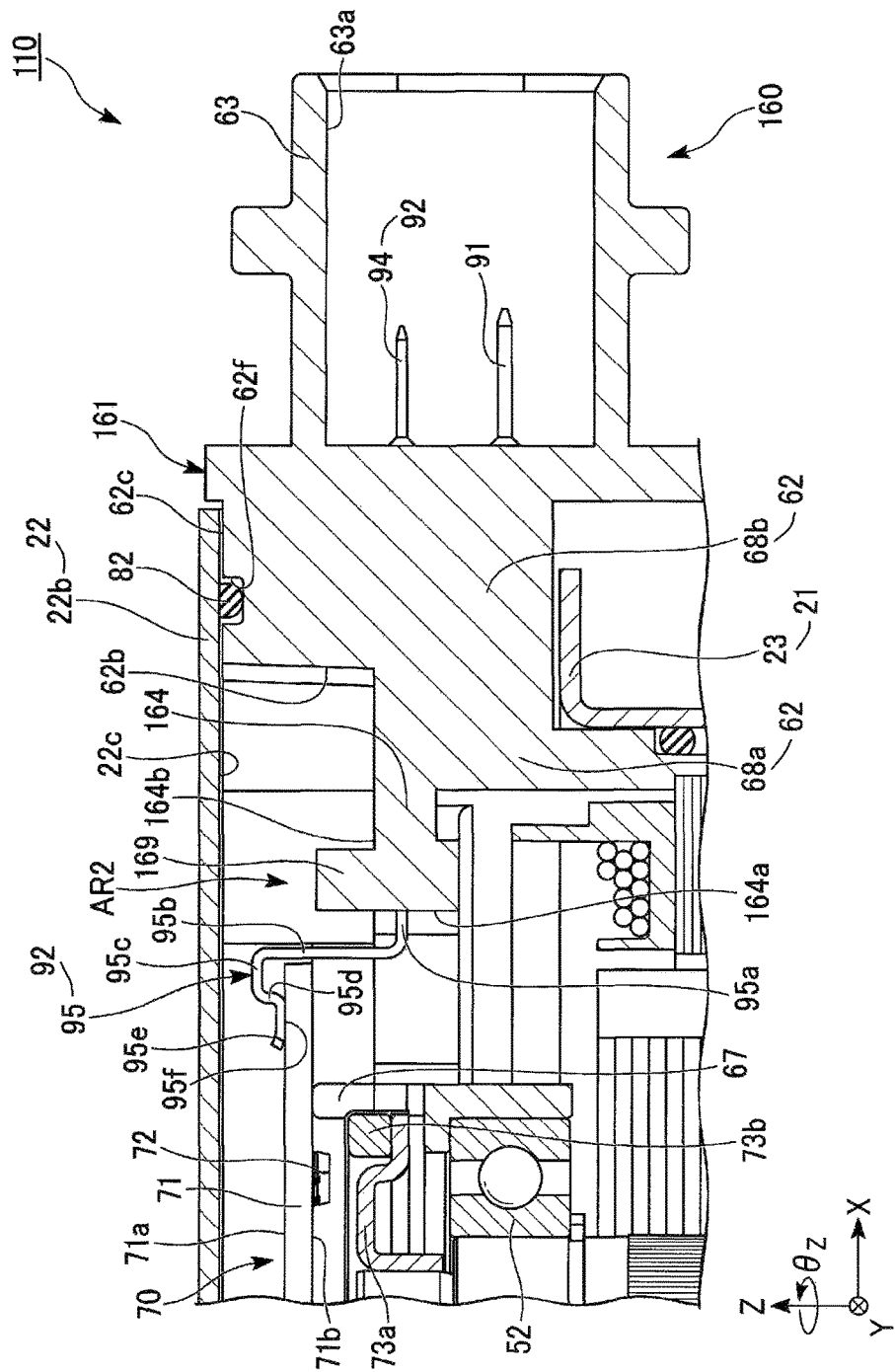
FIG. 5 is a partially enlarged cross-sectional view illustrating another example of the motor according to a preferred embodiment of the present invention.

The motor according to this modified preferred embodiment may be, for example, the structure of FIG. 5. FIG. 5 is a partially enlarged cross-sectional view of the motor 110 according to another preferred embodiment of the present invention. In the following description, the same constituent components as those of the above-mentioned preferred embodiments are denoted with the same reference numbers, and therefore the description thereof may be omitted.

As illustrated in FIG. 5, the motor 110 preferably includes a bus bar assembly 160. The bus bar assembly 160 is provided with a bus bar holder 161. The bus bar holder 161 includes a connection terminal holding portion 164.

The connection terminal holding portion 164 preferably includes a holding portion rear surface 164b located at the rear side (+Z side). At least one rib 169 is disposed in the holding portion rear surface 164b. The rib 169 protrudes from the holding portion rear surface 164b to the rear side at the end of the radially inner side of the holding portion rear surface 164b.

The end of the rear side of the rib 169 is located at the front side (−Z side) ahead of the circuit board rear surface 71a. That is, the end of the rear side at the holding portion inner surface 164a including the radially inner surface of the rib 169 is located at the front side ahead of the circuit board rear surface 71a. Accordingly, in the radial direction, an air gap AR2 is constructed in the connection terminal holding portion 164 of the circuit board 71. Other constituent elements of the motor 110 are identical to those of the motor 10 shown in FIGS. 1 to 4, and therefore the description thereof will be omitted.

In accordance with the above-mentioned structure, the rib 169 is located in the connection terminal holding portion 164, resulting in increased rigidity of the connection terminal holding portion 164. Therefore, the bus bar holder 161 is able to be prevented from being deformed by external force or the like.

While preferred embodiments of the present invention have been described above, it is to be understood that variations and modifications will be apparent to those skilled in the art without departing from the scope and spirit of the present invention. Further, features of the above-described preferred embodiments and the modifications thereof may be combined appropriately as long as no conflict arises. The scope of the present invention, therefore, is to be determined solely by the following claims.

What is claimed is:

1. A motor, comprising:
   a rotor including a shaft with a center on a center axis extending in one direction from a first side of the motor to a second side of the motor;
   a stator enclosing the rotor and rotating the rotor about the center axis;
   a cylindrical housing holding the stator;
   a bus bar assembly including a surface facing the first side of the motor and opposing the housing; and
   a circuit board disposed in the bus bar assembly and opposing an inner surface of the bus bar assembly in a radial direction which is perpendicular to the center axis; wherein
   the bus bar assembly includes:
      a wiring member electrically connecting an external power supply to the circuit board; and
      a bus bar holder that holds the wiring member;
   the bus bar holder includes:
      a cylindrical main body portion; and
      a connector portion that protrudes from the main body portion toward a radially outer side of the center axis;
   the wiring member includes:
      an external power-supply connection terminal provided in the connector portion to be electrically connected to the external power-supply; and
      a circuit board connection terminal that is electrically connected to the circuit board; and
   at least one other portion of the wiring member is located closer to the second side of the motor in the one direction than the external power-supply connection terminal.

2. The motor according to claim 1, wherein at least a portion of the circuit board connection terminal is located closer to the second side of the motor in the one direction than the external power-supply connection terminal.

3. The motor according to claim 2, wherein a portion of the circuit board extends closer to the external power-supply connection terminal in the radial direction than a portion of the circuit board connection terminal.

4. The motor according to claim 1, wherein an air gap is housed within the cylindrical main body portion at a position radially outward from an end of the circuit board and between the circuit board and an inner surface of the main body portion.

5. The motor according to claim 1, further comprising:
   a first bearing located at a first side of the stator in the one direction and supporting the shaft;
   a second bearing located at a second side of the stator opposite to the first side of the stator and supporting the shaft.

6. The motor according to claim 1, wherein at least a portion of the circuit board connection terminal includes a bent portion which is bent at or almost at a right angle.

7. The motor according to claim 1, further comprising a sensor magnet facing the circuit board.

8. The motor of claim 1, wherein the circuit board connection terminal includes:
   a first portion protruding out from the cylindrical main body portion; and
   a second portion located inside the cylindrical main body portion.

9. The motor of claim 1, wherein the surface of the second side of the circuit board is located at the second side of the external power-supply connection terminal.

10. The motor of claim 1, wherein:
    at least a portion of the bus bar overlaps with the circuit board in the radial direction.

11. The motor of claim 1, wherein the circuit board connection terminal and at least a portion of the bus bar are located at different positions in a circumferential direction of the center axis.

12. The motor of claim 1, wherein:
    the circuit board connection terminal includes a flat plate-shaped portion;
    the plate-shaped portion includes a connection surface parallel or substantially parallel to the surface of the second side of the circuit board; and
    the connection surface is in contact with the surface of the second side of the circuit board.

13. The motor of claim 1, wherein the surface of the second side of the connection terminal holding portion is provided with a rib.

* * * * *